(12) United States Patent
Nale

(10) Patent No.: US 10,969,997 B2
(45) Date of Patent: Apr. 6, 2021

(54) MEMORY CONTROLLER THAT FILTERS A COUNT OF ROW ACTIVATE COMMANDS COLLECTIVELY SENT TO A SET OF MEMORY BANKS

(71) Applicant: Intel Corporation, Santa Clara, CA (US)

(72) Inventor: William Nale, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/183,627

(22) Filed: Nov. 7, 2018

(65) Prior Publication Data

US 2019/0073161 A1 Mar. 7, 2019

(51) Int. Cl.
*G06F 12/00* (2006.01)
*G06F 3/06* (2006.01)
*G06F 13/16* (2006.01)
*G06F 13/20* (2006.01)
*G06F 13/00* (2006.01)
*G06F 13/28* (2006.01)

(52) U.S. Cl.
CPC .......... *G06F 3/0659* (2013.01); *G06F 3/0604* (2013.01); *G06F 3/0673* (2013.01); *G06F 13/1668* (2013.01); *G06F 13/20* (2013.01)

(58) Field of Classification Search
CPC .... G06F 3/0659; G06F 3/0673; G06F 3/0604; G06F 13/1668; G06F 13/20
See application file for complete search history.

(56) References Cited

U.S. PATENT DOCUMENTS

| | | | | |
|---|---|---|---|---|
| 7,898,892 B2* | 3/2011 | Klein | ................... | G11C 7/1006 365/189.07 |
| 2002/0001894 A1* | 1/2002 | Lee | ........................ | G11C 11/406 438/200 |
| 2003/0105932 A1* | 6/2003 | David | ................... | G06F 1/3203 711/167 |
| 2012/0017099 A1* | 1/2012 | David | ................... | G06F 1/3203 713/300 |
| 2013/0094317 A1* | 4/2013 | Lee | ................... | G11C 11/40618 365/222 |
| 2015/0003180 A1* | 1/2015 | Kim | ....................... | G11C 11/406 365/222 |
| 2015/0200002 A1* | 7/2015 | Lin | ...................... | G11C 7/1072 711/106 |
| 2017/0091120 A1* | 3/2017 | Gopal | ................. | G06F 12/1408 |

* cited by examiner

*Primary Examiner* — Mark A Giardino, Jr.
(74) *Attorney, Agent, or Firm* — Compass IP Law PC

(57) ABSTRACT

A memory controller is described. The memory controller includes a register to collectively track row active commands sent to multiple memory chip banks of a memory rank. The memory controller includes a filter circuit to prevent an activate count value that is to be maintained in the register from being incremented in response to a row activate command that is sent to a different bank than a prior row activate command that caused the activate count value to be incremented

15 Claims, 9 Drawing Sheets

MEMORY CONTROLLER THAT FILTERS A COUNT OF ROW ACTIVATE COMMANDS COLLECTIVELY SENT TO A SET OF MEMORY BANKS

BACKGROUND

DRAM memories are known to exhibit data disturbances/corruptions that are a function of how often row access lines of the storage cell array are activated. As such, designers of memory controllers that interface to DRAM memories need to develop circuitry that attempts to prevent such disturbances/corruptions from occurring.

FIGURES

A better understanding of the present invention can be obtained from the following detailed description in conjunction with the following drawings, in which.

DESCRIPTION

Figure 1:
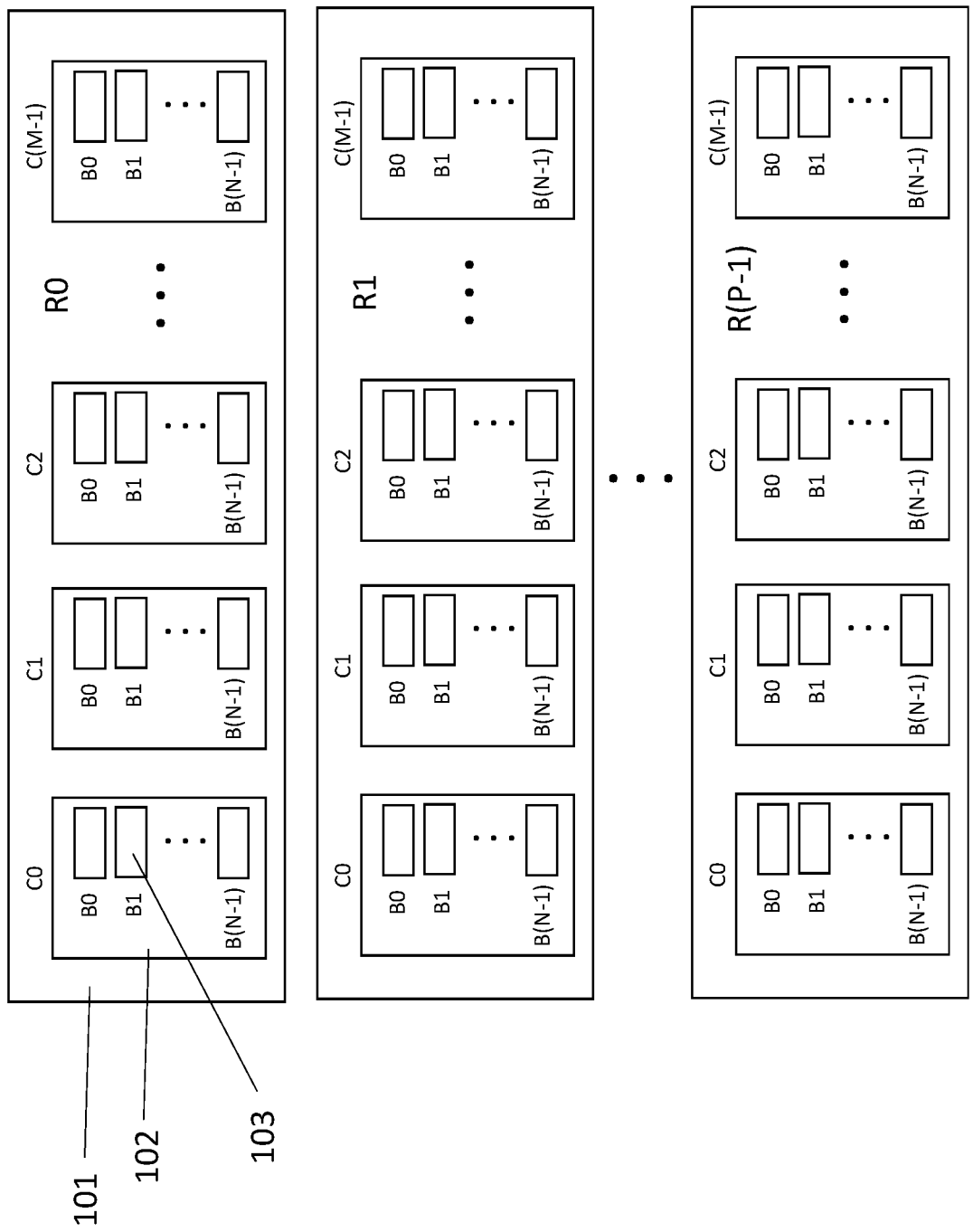
FIG. 1 shows a plurality of memory ranks.

FIG. 1 shows a high level view of a memory system such as the main memory of a computer, or, the local memory of a graphics processor unit (GPU). As depicted in FIG. 1, the memory system can be viewed as being composed of a number of ranks R0-R(P−1). Each rank, in turn, can be viewed as being composed of a number semiconductor memory chips C0-C(M−1). Further still, each memory chip can be viewed as being composed of a number of memory banks B0-B(N−1). For ease of drawing, FIG. 1 only numerically labels one rank 101, one semiconductor memory chip 102 and one memory bank 103.

In practice, commonly, a same memory controller (not shown in FIG. 1) is coupled to each of the memory ranks and is responsible for resolving the particular address of a read/write request to a particular one of the ranks. Here, the "width" of the data bus that transports data between the memory controller and the memory system is effected by the M memory chips that exist "across" a rank. That is, for instance, if each memory chip has a four bit wide data bus ("X4") and there are ten memory chips per rank (i.e., M=9), then, the data bus is 40 bits wide, and, the memory controller and memory system transfer data between them in units of 40 bits per cycle (e.g., 32 bits of data plus 8 bits of ECC).

Each memory bank is implemented as an array of storage cells arranged into rows and columns. The memory controller is therefore not only responsible for resolving an address to a particular rank, but also, for additionally resolving the same address to a particular bank and particular row and column within the bank. Here, the same row of the same bank in each of the memory chips of the targeted rank is simultaneously accessed to realize the full width of the data bus. A data transfer between the rank and the memory controller therefore entails accessing the same bank of each of the rank's memory chips and accessing the same row and column of each such bank.

Figure 2:
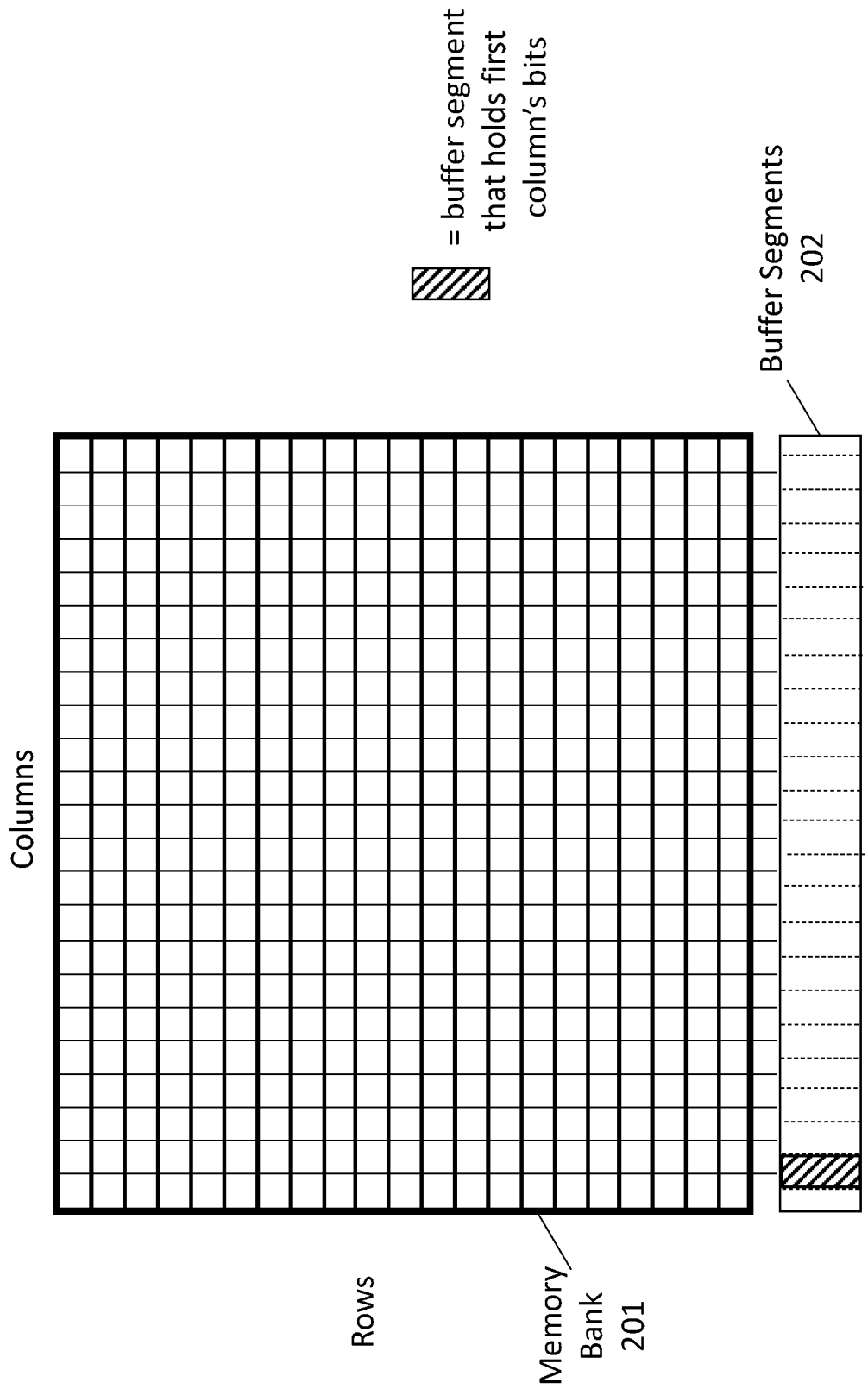
FIG. 2 shows a memory bank.

FIG. 2 shows a memory bank 201 in a dynamic random access memory (DRAM) memory chip. When a particular read or write address is resolved to a particular row of the bank 201, the row is "activated" which activates the storage cells along all the columns that are coupled to the activated row.

In the case of a read, the storage cells that are coupled to the activated row are physically read from their storage locations and entered into sense amp buffer segments 202 that are respectively aligned with the columns that are coupled to the activated row. The column address component of the read address is resolved to the particular buffer segment that holds the bits that were read along the column that the column address component of the read address corresponds to. These bits are then issued by the particular buffer segment to form the read response.

Because the read-out of the storage cells is destructive (the storage cells lose their data), the contents of all buffer segments 202 are subsequently written back into the storage cells to complete the read process. Note that in cases where consecutive read requests target a same row, the corresponding, individual buffer segments can be read out in rapid succession. That is, only one row activation and storage cell read-out into the buffer segments 202 is needed to service all of the consecutive read requests. Computing systems are often designed such that a "page" of memory content corresponds to the data that is stored along a row of a DRAM memory rank. Here, CPUs frequently access data on a same page in succession and can take advantage of multiple reads being supported by only a single row activation and buffer load.

In the case of a write, as with reads, the targeted row is activated and the storage cells of all columns that are coupled to the row are read-out and entered into the buffer segments 202. Write data is written over the content of the buffer segment that the column address of the write resolves to. The contents of all buffer segments 202 are then written back to their corresponding storage cells.

In a common memory system, referring back to FIG. 1, the memory controller has multiple memory channels that each are capable of supporting two dual-in-line modules (DIMMs). That is, two DIMMs can be plugged into each memory channel. Moreover, in a higher capacity system, there are two ranks per DIMM. For example, the "front side" of a DIMM may have disposed thereon a first rank, and, the "back side" of the DIMM may have disposed thereon on a second rank. Thus, in a design where a memory channel can support up to two DIMMs per memory channel, each memory channel can be coupled to up to four ranks of memory.

A reason for the limitation of only two DIMMs per memory channel is the capacitive loading that each DIMM imparts when plugged into the channel. Here, the highest frequency that can be transported over the channel decreases as its capacitive loading increases. For this reason, there is presently a limit of two DIMMs per memory channel in higher end computers to ensure that the memory channel can remain operable at higher frequencies which translates into reduced access delays accessing the information within the DIMMs' memory chips.

At the same time, there is an increased need for memory capacity per computer. Generally, computing system or GPU performance increases with increasing memory capacity (more data can be processed faster). With the need to increase memory capacity and the limitation of only two memory DIMMs per memory channel, system designers are designing memory controllers that support more memory channels than previous systems (e.g., whereas previous systems may have included only two or four memory channels per memory controller, by contrast, newer systems are being designed with memory controllers that can support eight, sixteen, etc. memory channels per memory controller).

An additional challenge with DRAM based memory systems is avoiding row hammer corruption. Here, if a row of a DRAM memory bank is activated too frequently, data that is stored in storage cells that are coupled to neighboring rows can become corrupted (e.g., if row 5 is activated too many times, data stored along rows 4 and 6 can be corrupted). In order to address row hammer data corruption problems, memory controllers can be designed to keep track, in some fashion, of the number of times they have activated a particular row in the DRAM memory devices they send read/write requests to.

According to one approach, the memory controller is designed to keep an activation counter for each bank of a single memory chip for each rank that the memory controller interfaces with. Here, by only counting activation counts per bank (and not by row), the memory controller assumes a worst case scenario that all activations to a same bank are targeting a same row. If the activation count for a particular bank reaches a threshold value, the memory controller will take affirmative action to refresh the bank (e.g., send refresh commands to the memory chips of the particular rank that identifies the bank needing refresh).

Reserving one counter per bank per rank however is not feasible for high rank configurations. More specifically, referring to FIG. 1, ideally the memory controller includes NP registers to provide the appropriate number of bank counters. However, with higher density DRAMs (which drives larger N) and with higher supported memory channels per memory controller (which drives larger P), the number of needed registers for per bank activation tracking (NP) is not feasible at least for high values of P (larger rank configurations).

Figure 3:
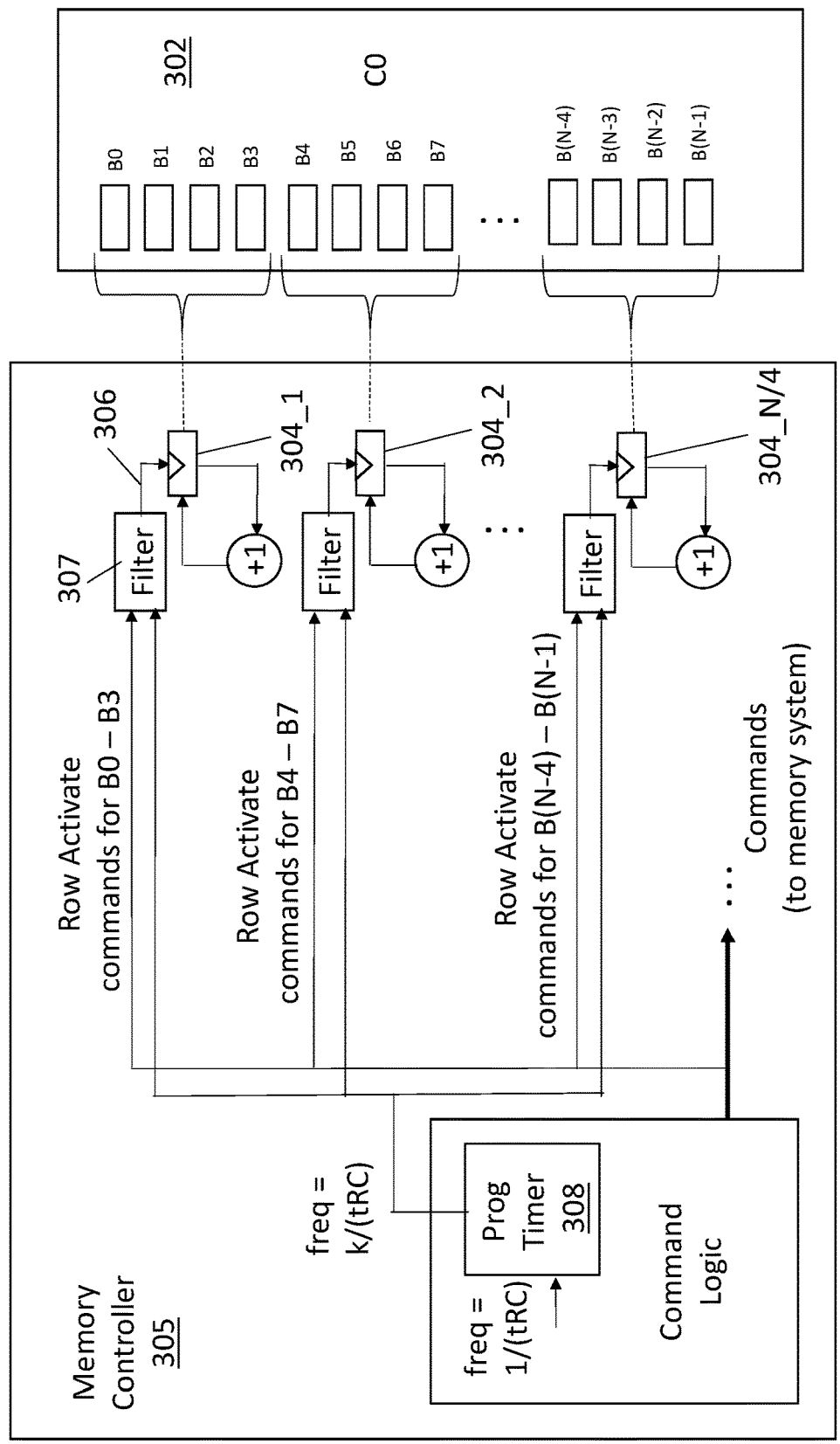
FIG. 3 shows a memory controller that collectively tracks row activate commands sent to a set of memory banks.

A solution is presented in FIG. 3. As observed in FIG. 3, at least for large P configurations (e.g., eight memory channels, sixteen memory channels, etc.), there are multiple banks per activation count register 304 within the memory controller 305. Here, bank activation count register 304_1 keeps an activation count for banks B0 through B3, bank activation count register 304_2 keeps an activation count for banks B4 through B7, . . . and bank activation count register 304_N/4 keeps an activation count for banks B(N−4) through B(N−1). That is, there is only activation count register for every four banks in memory chip 302. Notably, four banks per activation counter is only exemplary and other embodiments may choose less or more banks per register.

For ease of drawing, the banks of only one memory chip 302 are depicted in FIG. 3. Consistent with the above discussion, because same banks of all memory chips of a targeted rank are simultaneously activated for accesses made to that rank, the activation count registers 304 of FIG. 3 are sufficient to track the activation counts for the entire rank that memory chip 302 belongs to. With the total number of activation count registers per rank being equal to the number of banks per memory chip divided by 4 (N/4), if the memory channel is configured to support P ranks, the memory controller need only include NP/4 registers (rather than NP). The lesser number of activation count registers is feasible for larger P values and therefore immediately solves the problem of not having enough activation count registers for large P configurations.

A challenge, however, is the reduced accuracy of detecting an actual row hammer threat. Here, the memory controller 305 increments the value in an activation count register 304 whenever a row activate command is sent by the memory controller 305 to any of the four banks that the register is tracking. For example, the value of register 304_1 is incremented whenever a row activate command is sent to any of banks B0 through B3, the value of register 304_2 is incremented whenever a row activate command is sent to any of banks B4 through B7, etc.

The memory controller 305 determines appropriate row hammer mitigation treatment once the value in a particular activation count register reaches a threshold value (e.g., sending refresh commands to the afflicted memory chips). Here, however, the memory controller 305 is essentially forced to assume a worst case—but highly unlikely—scenario in which all row activate commands have been sent to the same row of the same bank in the set of banks that the particular activation count is tracking. Correspondingly, row hammer threat detection can be extremely over conservative. That is, large numbers of row hammer threat detection "false alarms" are raised resulting in frequent and unnecessary mitigation tactics being invoked (e.g., large numbers of unnecessary refresh commands are sent to the memory chips). As a consequence, memory system performance will noticeably drop because too much time is spent performing unnecessary refreshes rather than responding to read/write requests.

In order to reduce the frequency of such false alarms, as depicted in FIG. 3, the mechanism for incrementing a count value filters out row activates that could not have been sent to a same bank. Here, the row hammer effect is primarily due to rapid succession of activations to neighboring rows of the victim row. Such activations can only happen if the rapid succession of activations are directed to the same bank. Therefore, successive activations that are known to be directed to different banks can be discounted/ignored.

Referring to register 304_1 specifically, the value in register 304_1 will be incremented whenever a trigger signal (e.g., a clock edge) is observed at an input 306 that causes the register 304_1 to load in a next value. Without the filter 307, register 304_1 would increment whenever a row activate command is sent to any of banks B0 through B4.

However, in some cases it will be clear from the flow of row activate commands that are sent to banks B0 through B3 that certain row activate commands where not sent to a same bank. For example, according to a certain memory accessing requirements, a longer delay is required to exist between consecutive row activate commands sent to a same bank than to different banks. That is, row activate commands can be issued at greater rapidity when the row activate commands are being sent to different banks.

Here, a Row Cycle Time (tRC) requirement (e.g., as defined by a Joint Electron Device Engineering Council (JEDEC) standard) specifies the minimum time that is permitted to elapse between row activate commands that are sent to a same bank. As such, referring to FIG. 4, if the filter 307 observes any row activate commands within tRC after it last permitted the count value to be incremented, the filter 307 ignores them.

Figure 4:
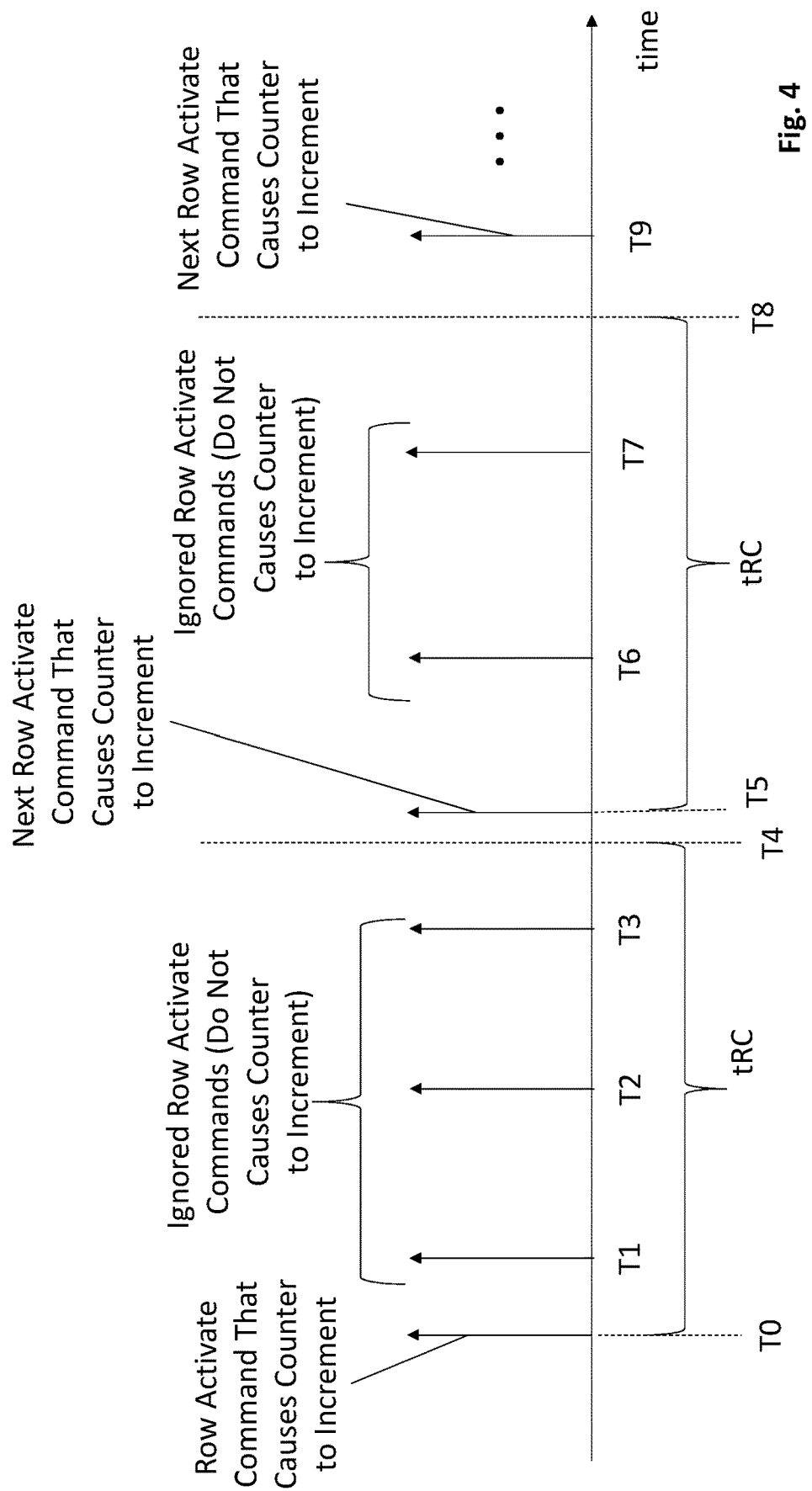
FIG. 4 shows an approach for filtering a row activate count that collectively tracks row activate commands sent to a set of memory banks.

FIG. 4 shows an example of the filtering activity in more detail. At time T0 a row activate command is received for one of banks B0-B3, assume B0, that causes the counter 304_1 that tracks activations for banks B0-B3 to be incremented. With the row activate command causing the counter to be incremented, a timer is started within the filter 307 that expires at T0+tRC=T4. Before T4, however, three more row activate commands are directed to the B0-B3 bank set at times T1, T2 and T3.

Here, it is guaranteed that none of the row activate commands of times T1, T2 and T3 are directed to bank B0 because they are being issued before the passing of the tRC timing requirement which expires at T4. Moreover, it is guaranteed that none of the row activate commands of times T1, T2 and T3 were sent to any same bank because any of them would likewise offend their corresponding tRC timing requirement. Therefore, none of the row activate commands of times T1, T2 and T3 could contribute to a row hammer effect (none were sent to B0 and no two were sent to any same bank). As a consequence, all three of the row activate commands of times T1, T2 and T3 can be ignored (the filter 307 does permit them to increment the counter 304_1).

After time T4 passes a next row activate command is issued at time T5. The filter 307 permits the row activate command at time T5 to increment the counter 304_1 because it is issued after expiration of the tRC timer. However, with the row activate command of time T5 causing the counter 304_1 to be incremented, the tRC timer is restarted again at time T5. Two more row activate commands are received at times T6 and T7 before expiration of the timer and are ignored by the filter 307 for the same reasons described above. After expiration of the timer at T5+tRC=T8, another row activate command is received which the filter 307 permits to increment the counter 304_1 and the process continues.

Here, of the eight row activate commands that are observed in FIG. 4, five are ignored which keeps the count value properly lower rather than running up at the rate at which all banks in the B0-B3 bank set are receiving row activate commands. It is possible that the three row activate commands that were permitted to increment the counter (received at times T0, T5, T9) were directed to different banks and therefore do not contribute to a row hammer effect amongst themselves in isolation. The memory controller is therefore forced to assume a worst case scenario that all three were sent to the same bank, However, the rate at which row hammer false alarms are generated should be far less than without the filtering technique.

Figure 5:
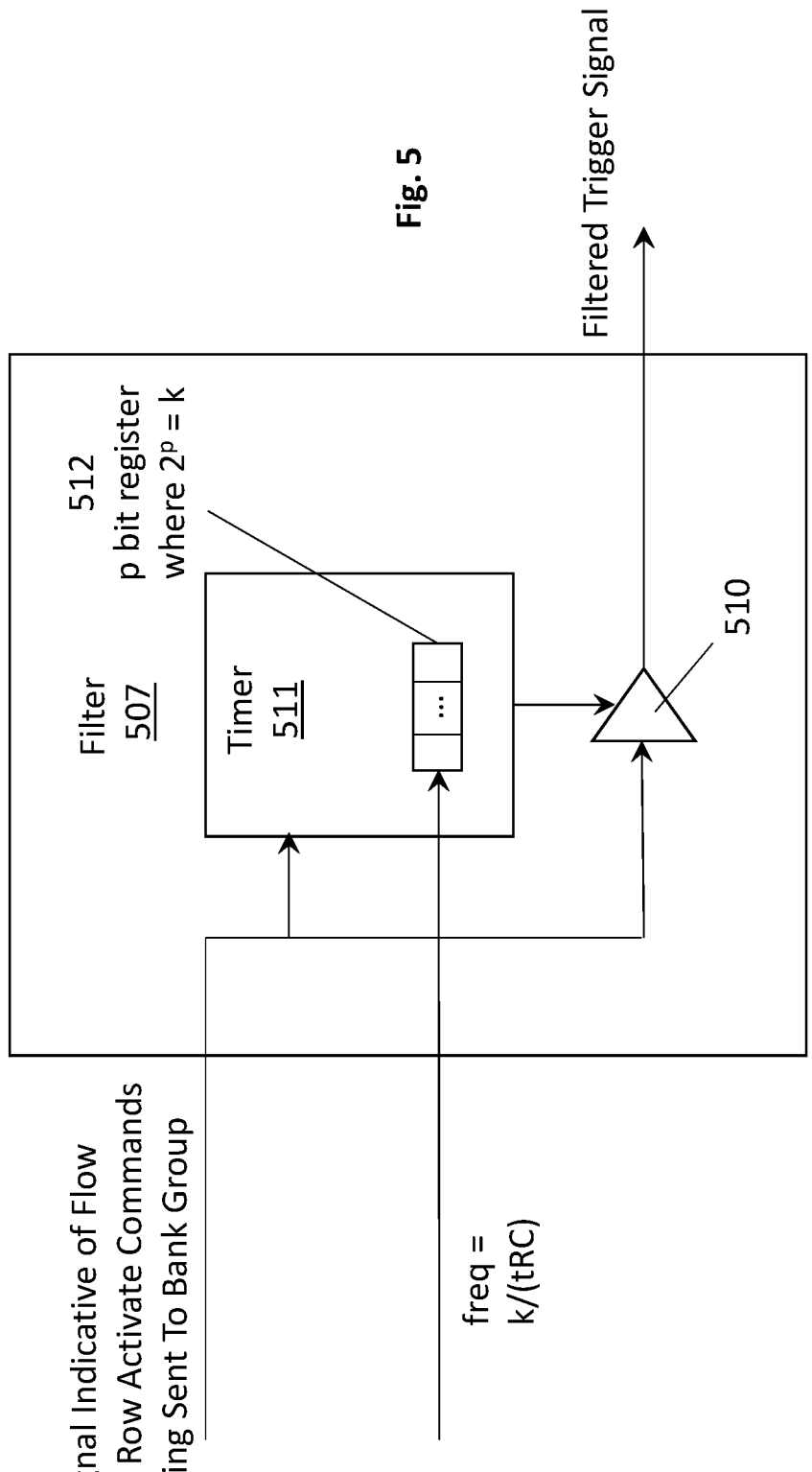
FIG. 5 shows an embodiment of a filter circuit.

FIG. 5 shows an embodiment of the filter circuitry 507. Here, a signal that is indicative of the flow of row activate commands being sent to the bank set (e.g., a signal that toggles or edge triggers each time a row activate command is sent to a bank in the bank set) is directed to a gating circuit 510. The gating circuit 510 generates a trigger output signal from the input flow signal under the control of the timer circuit 511. The timer circuit 511 observes the input flow and determines if a next row activate command has been received after expiration of the tRC timer. If so, it enables the gating circuit 510 to send an increment trigger to the counter. If not, the gating circuit is not enabled which effectively ignores the next row activate command.

A concern is that a high frequency clock signal combined with a long tRC time period can correspond to very large count values needed to reach the tRC expiration time (e.g., seven bits of information). The register space needed to keep a large count value would begin to defeat the purpose of overall approach (each bank set would now have row activate count register space and larger tRC timer register space).

A solution is to feed a slower clock signal to the filter timer 511 having both: 1) a greatly reduced frequency (at least as compared to some of the high frequency clocks in the memory controller); and, 2) a corresponding temporal period that is a fraction of tRC. Referring to FIG. 3, the command logic of the memory controller includes a timer/counter 308 that generates a slower clock signal having a period of (tRC)/k (which corresponds to a frequency of k/(tRC)). The slower clock signal is then fed to each of the activation counters 304.

Referring to FIG. 5, receipt of the slower clock signal provides for the filter timer 511 to have a reduced bit width counter register 512 for timing the expiration of tRC. For example, if k=8, then the counter register 512 can be implemented with a 3 bit register (every rollover of the 3 bit counter register 512 corresponds to 8 ticks of the slower clock which, in turn, corresponds to an elapsed time period of tRC). Referring back to FIG. 3, the timer 308 that generates the slower clock signal may be a programmable timer (or programmable clock generator) so that different clocks having temporal periods of different fractions of tRC can be generated (e.g., as a function of performance vs. gate count).

In other scenarios, referring to FIG. 3, the filter 307 is not necessary because a bank set whose activations are being kept track of by a same counter register (e.g., banks B0-B3 whose activations are being kept track of by same counter register 304_1) have an architectural restriction in which consecutive activations are not permitted to be directed to a same bank (e.g., only one bank in the bank set can have a page open at any time). That is, the memory controller is required to direct a next activation to a different bank than the immediately preceding activation. In cases of such an architectural restriction, the filter 307 is not necessary and the activate counter 304 can be incremented with each activation.

Emerging next generation memories are also being integrated with internal row hammer tracking and/or mitigation intelligence and/or capabilities. According to the DDR5 JEDEC memory interface specification, memory suppliers are to include with memories a set of activation count parameters, RAAIMT (Rolling Accumulated ACT Initial Management Threshold) and RAAMMT (Rolling Accumulated ACT Maximum Management Threshold), that the memory controller relies upon in order to recognize when threats of row hammer disturbances are becoming more elevated.

In particular, a first threshold level ("the RAAIMT threshold") is set as a first multiple of the RAAIMT parameter (e.g., 2 or 3). An activation count that reaches the RAAIMT threshold is an indication that the threat of a row hammer disturbance is elevated but not critical. As such, the memory controller, in response, is supposed to opportunistically send a special refresh command (REFM) (e.g., as soon as is practicable). By contrast, an activation count that reaches the RAAIMT value multiplied by the RAAMMT parameter (the RAAMMT threshold) is an indication that the threat of a row hammer disturbance is imminent (the RAAMMT parameter is a number greater than the multiple of the RAAIMT value that determines the RAAIMT threshold). In response to the RAAMMT threshold being reached, the memory controller is supposed to immediately send an REFM command.

The memory chips include on board intelligence that understands which row(s) of which bank(s) is/are most in danger of a row hammer disturbance and apply the REFM commands to them. Thus the memory controller is only responsible for receiving the RAAIMT and RAAMMT values and sending REFM commands to the memory controller based on them and the activation counts it keeps.

Figure 6A:
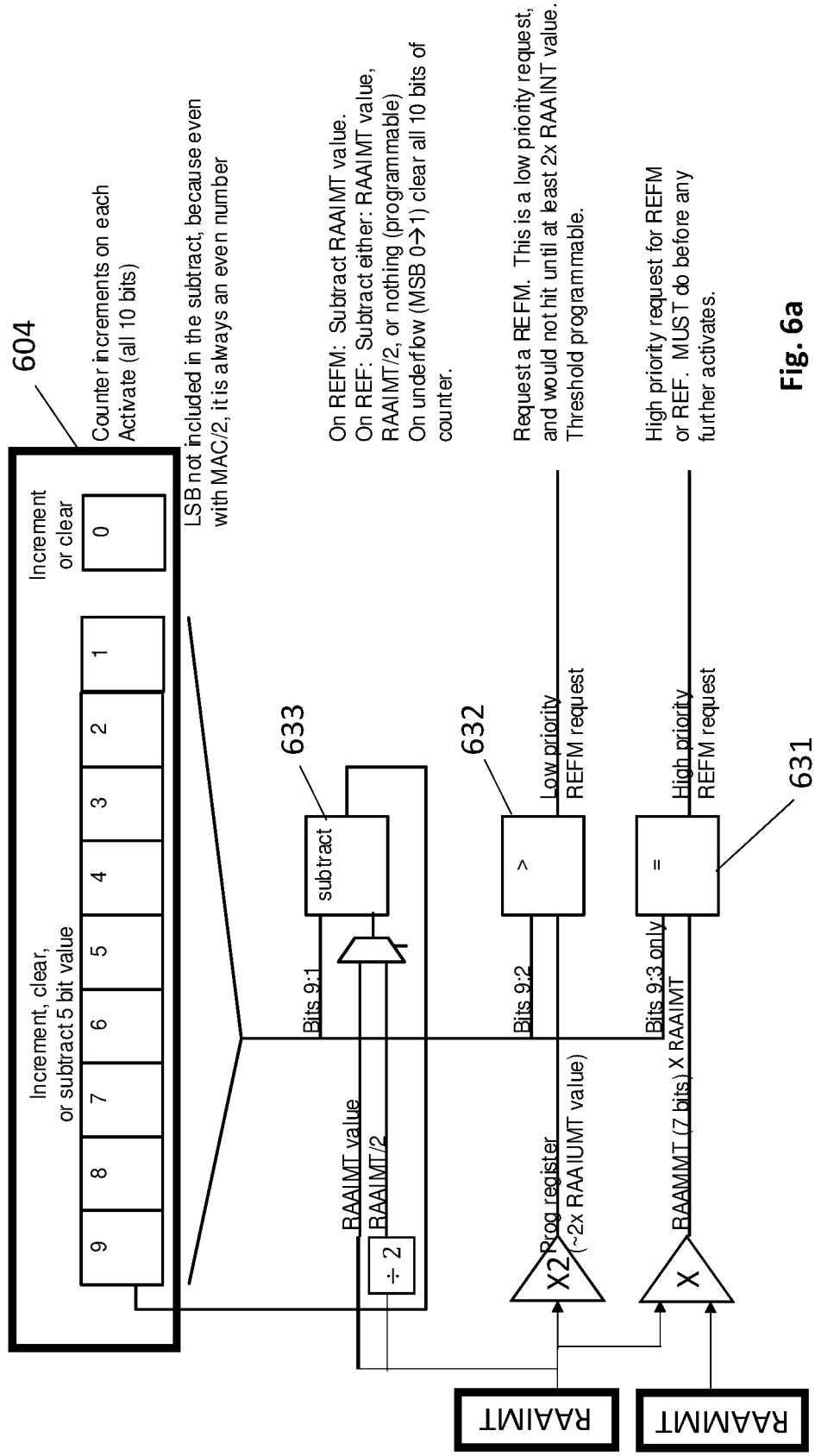
FIGS. 6a, 6b and 6c show embodiments of circuits that are to raise memory refresh flags.

FIG. 6a shows a first embodiment of a memory controller circuit that can be instantiated, e.g., per activate counter (or per bank set), to raise flags that either the RAAIMT threshold or RAAMMT threshold have been reached. As observed in FIG. 6a, the activate counter (e.g., such as any of the activate counters 304 of FIG. 3) is implemented as a 10 bit counter 604 that increments, as described above, when the filter is enabled, each time a next activate command is sent tRC after a preceding activate command (note the tRC filter may or may not be enabled as described in reference to the configuration space options described in more detail below). The use of a 10 bit counter is exemplary and other bit widths are possible.

First and second comparators 631, 632 compare higher ordered bits of the activate count in the activate count register 604 to the RAAMMT threshold and the RAAIMT threshold (which FIG. 6a indicates is 2× the RAAIMT value). Here, comparison of higher ordered bits accounts for the RAAIMT threshold and RAAMMT threshold being fewer bits than the activation counter 604 (whereas the counter 604 is 10 bits, the RAAIMT threshold and RAAMMT threshold are 5 and 7 bits respectively in the particular embodiment of FIG. 6a).

Each time the memory controller sends an REFM command in response to a raised flag, the activate count in the activate counter register 604 is reduced by the RAAIMT value (the bank set that the activate count keeps track of may be identified in the REFM command). The subtraction circuit 633 performs the subtraction of the activation count by the RAAIMT value. The output of the subtraction is written back to the register 604.

By contrast, each time the memory controller sends a normal, regularly scheduled refresh (REF) to a bank in the bank set, the DRAM memory will inform the memory controller how much credit the regular refresh deserves. As is known in the art, the banks of DRAM memory devices regularly receive scheduled refresh commands (REFS) from the memory controller as part of normal operation. Here, the "credit" allocation assigned by the DRAM memory by a normal refresh corresponds to a decrement to be applied to the activate count. In various implementations, the DRAM memory will inform the memory controller whether the regular refresh deserves full credit (e.g., a decrement by the RAAIMT value), less than full credit (e.g., a decrement by RAAIMT/2), or, no credit at all (no decrement). The DRAM memory bases the credit decision on its own internal row hammer tracking and/or mitigation intelligence.

Figure 6B:
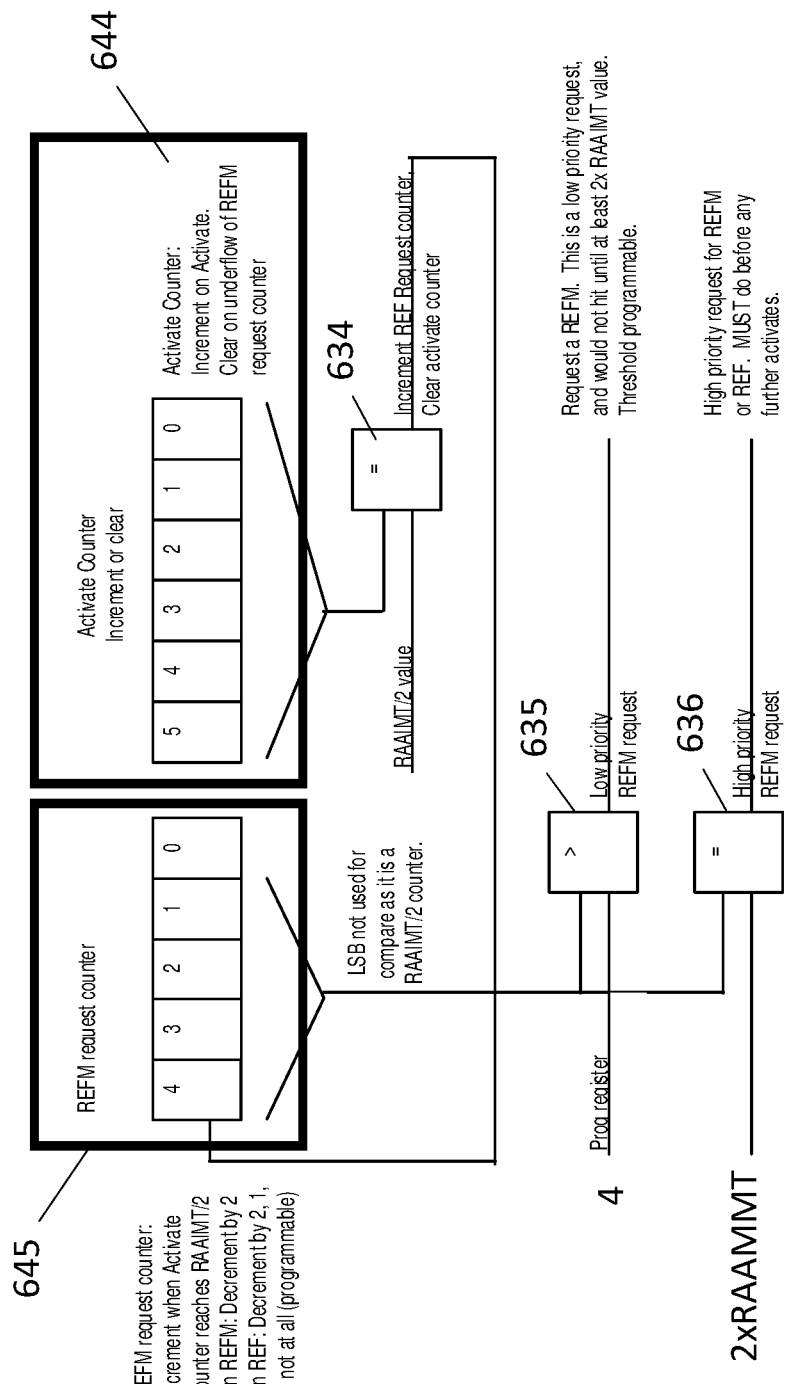

FIG. 6b shows another embodiment that effectively replaces the subtraction circuit 631 with a comparator circuit 634. According to the design of the circuit of FIG. 6b, rather than track total activate counts in the absolute, instead, the activate counter 644 tracks activates relative to the RAAIMT value. Here, activate counter 644 is incremented according to the techniques described above (e.g., whenever a next activate is observed tRC after a previous activate that incremented the counter if the filter is enabled). However, whenever the activate counter 644 reaches half the RAAIMT value it is cleared and a second, RAAIMT value counter 645 is incremented. That is, RAAIMT counter 645 counts how many times the activate counter 644 has reached half the RAAIMT value and the activate counter is cleared (rolls over) each time it reaches half the RAAIMT value.

Comparator 634 compares the activate counter 644 value against half the RAAIMT value. Its output signal on a comparison match both increments the RAAIMT value counter 645 and clears the activate counter 644. The state of the RAAIMT counter 645 (which counts at twice the rate at which the RAAIMT value is reached because the comparator 634 triggers on RAAIMT/2) then determines whether REFM commands are to be sent. Particularly, in the example of FIG. 6b, if the value is 2 a lower priority refresh is issued (i.e., low priority REFM triggers on 4 to effectively trigger on 2×RAAIMT (counter 645 has two ticks for every RAAIMT), or, if the value is 2×RAAMMT a higher priority REFM is issued (i.e., high priority REFM effectively triggers on RAAMMT×RAAIMT).

The count in the RAAIMT counter 645 counts at twice the rate at which a true RAAIMT counter would count so that a decrement made to the counter in response to a REFM refresh or a full credit normal refresh will reduce the count by 2, and, a half credit regular refresh will reduce the count by 1 (or 0 if the DRAM memory indicates the regular refresh is to receive no credit).

In various embodiments an instance of the flag-raising circuit of FIG. 6a, the circuit of FIG. 6b, or similar circuitry, is associated with each bank set whose row activates are collectively tracked (e.g., N/4 such circuits referred to FIG. 3).

In still other embodiments, a single instance of a flag raising circuit can support more than one bank set. For example, the various counter value(s) that are maintained for a particular bank set are multiplexed into the comparator, subtractor logic, etc. of a flag raising circuit. Any flags that are raised are understood to be applicable to the bank set whose count value(s) were multiplexed into the flag raising logic. Writebacks of updated (decremented/reset) count values are likewise multiplexed back into the particular counter registers that maintain the count(s) for the bank set that the flag raising logic just operated on.

Figure 6C:
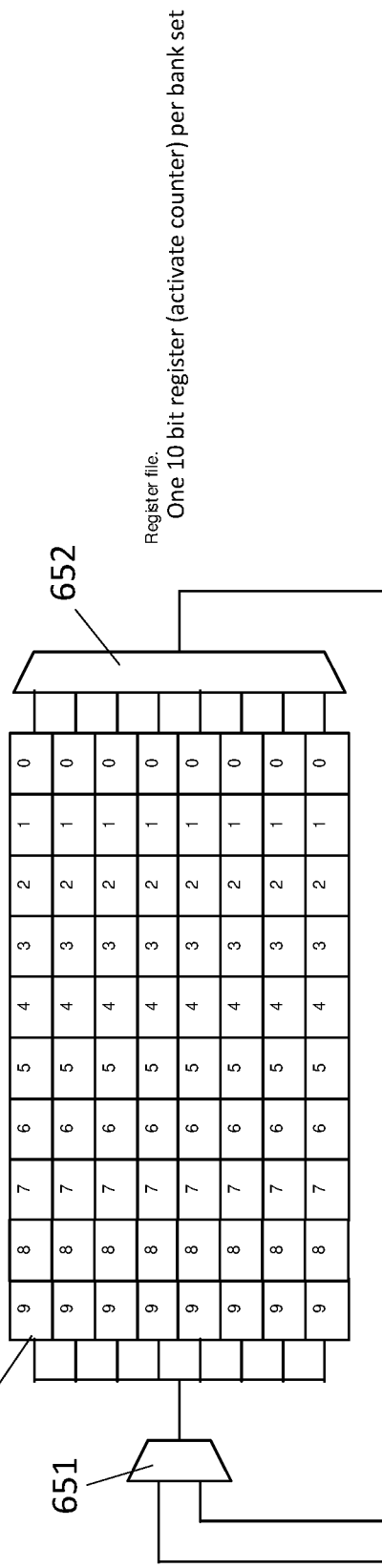
Figure 6C:
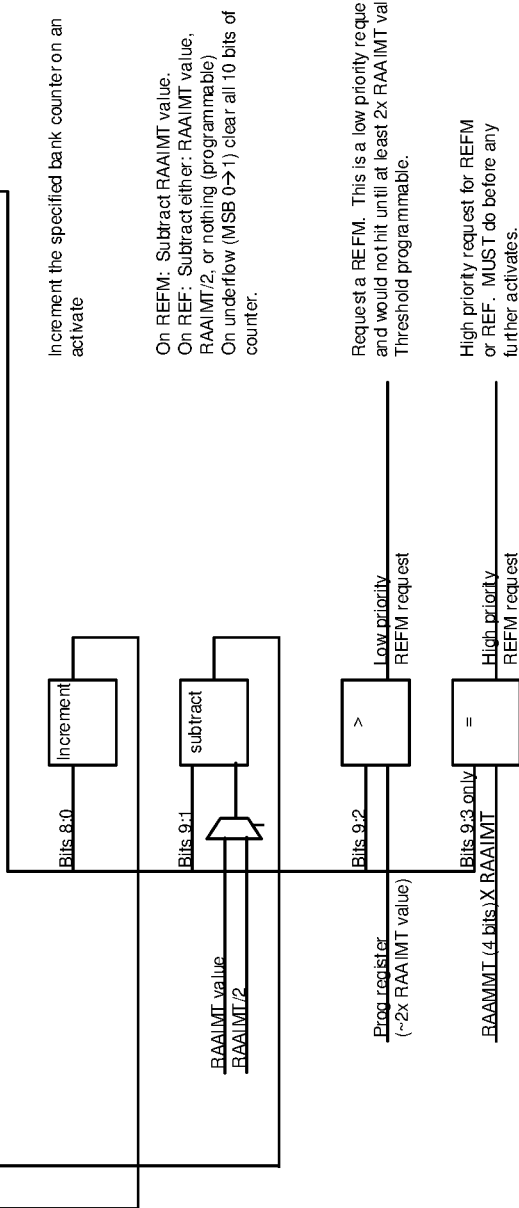

FIG. 6c shows an example of circuitry that uses a single instance of flag raising logic to support the flag raising function of more than one bank set. The flag raising circuitry of FIG. 6c adopts the flag raising approach of FIG. 6a. Here, the activate counters for the different bank sets (one 10 bit register per bank set) can be viewed as a register file 650, having input and output multiplexers 651, 652. Updated (decremented) counts received from the flag raising circuitry for a particular bank set are directed through the input multiplexer 651 and written into the appropriate register of the register file (i.e., the register for the bank set). Count values that are to be operated upon by the flag raising circuitry are directed through multiplexer 652 from the register of the register file that holds the count value(s) for the bank set that the flag raising circuitry is about to operate on. In an embodiment, increments (e.g., from a corresponding filter circuit for each activate count) may be made to any/all registers in the register file whose contents are not currently being operated upon by the flag raising circuitry.

In an embodiment, all bank sets are handled during a single Row Cycle Time cycle (which corresponds to the temporal granularity of the activation count activity of each bank set when the filter is activated). In lower rank configurations there may be enough registers in the register file 650 to support per bank activate counts in which case the flag raising circuitry supports the per bank flag raising function for all the banks that the memory controller interfaces with.

Note that different embodiments may choose different levels of granularity as to how many activation count registers are to be supported by a single flag raising circuit. At one extreme, all activation count registers in the memory controller are supported by a single flag raising circuit. In other embodiments, there may be a number of flag raising circuits instantiated in the memory controller equal to the maximum number of ranks that the memory controller is designed to be able to interface with so that, e.g., under a maximum rank configuration, there is one flag raising circuit per rank (with the number of bank sets per flag raising circuit being configured equal to the number of banks per rank (or per memory chip)).

The RAAIMT and RAAMMT values may be stored in configuration register space of the memory controller or larger system-on-chip (e.g., multi-core processor) that the memory controller is integrated on. Additionally, the trigger levels of any of the comparators and/or the amount by which decrements are made depending on refresh command type are all made configurable/programmable by configuration register space in the memory controller or its larger system-on-chip.

Referring back to FIG. 3, it is pertinent to point out that the memory controller may be designed to configure the size of the bank set per row activate count (i.e., how many banks have their row activates collectively tracked is configurable) as a function of the number of ranks (N) that the memory controller is configured to interface with. Here, the memory controller will include a fixed number, e.g., Y, of activate counters and associated circuitry (filters, REFM flag generation circuits, etc.).

If the number of ranks multiplied by the number of banks per memory chip is equal to Y, then, the memory controller can be configured such that each bank is able to have its own row activate counter (in which case the row activate counters increment with each row activate to a same bank, i.e., the approach of FIG. 4 is not utilized). By contrast, if the number of ranks multiplied by the number of banks per memory chip is equal to 2Y, then, the memory controller can be configured such that the bank set size=2 (two banks have their row activates collectively tracked), or, if the number of ranks multiplied by the number of banks per memory chip is equal to 4Y, then, the memory controller can be configured such that the bank set size=4 (four banks have their row activates collectively tracked as observed in FIG. 3), etc.

Thus, bank set size for row activate tracking is configurable based on the number of ranks the memory controller is configured to interface with. Here, the memory controller or larger system-on-chip (SOC) that the memory controller is a component of will contain configuration register space that establishes the particular configuration (establishes how many banks are to have their row activates collectively tracked). Additionally, configuration register space may establish whether the filter circuit is to be disabled or not (e.g., wherein the filter is disabled if there is some other requirement (e.g., configured architectural restriction) that prevents consecutive row activate commands from being sent to a same bank). Additionally, the configuration register space may define, for a programmable clock generator, the temporal fraction of the Row Cycle Time that the clock is to posses.

Figure 7:
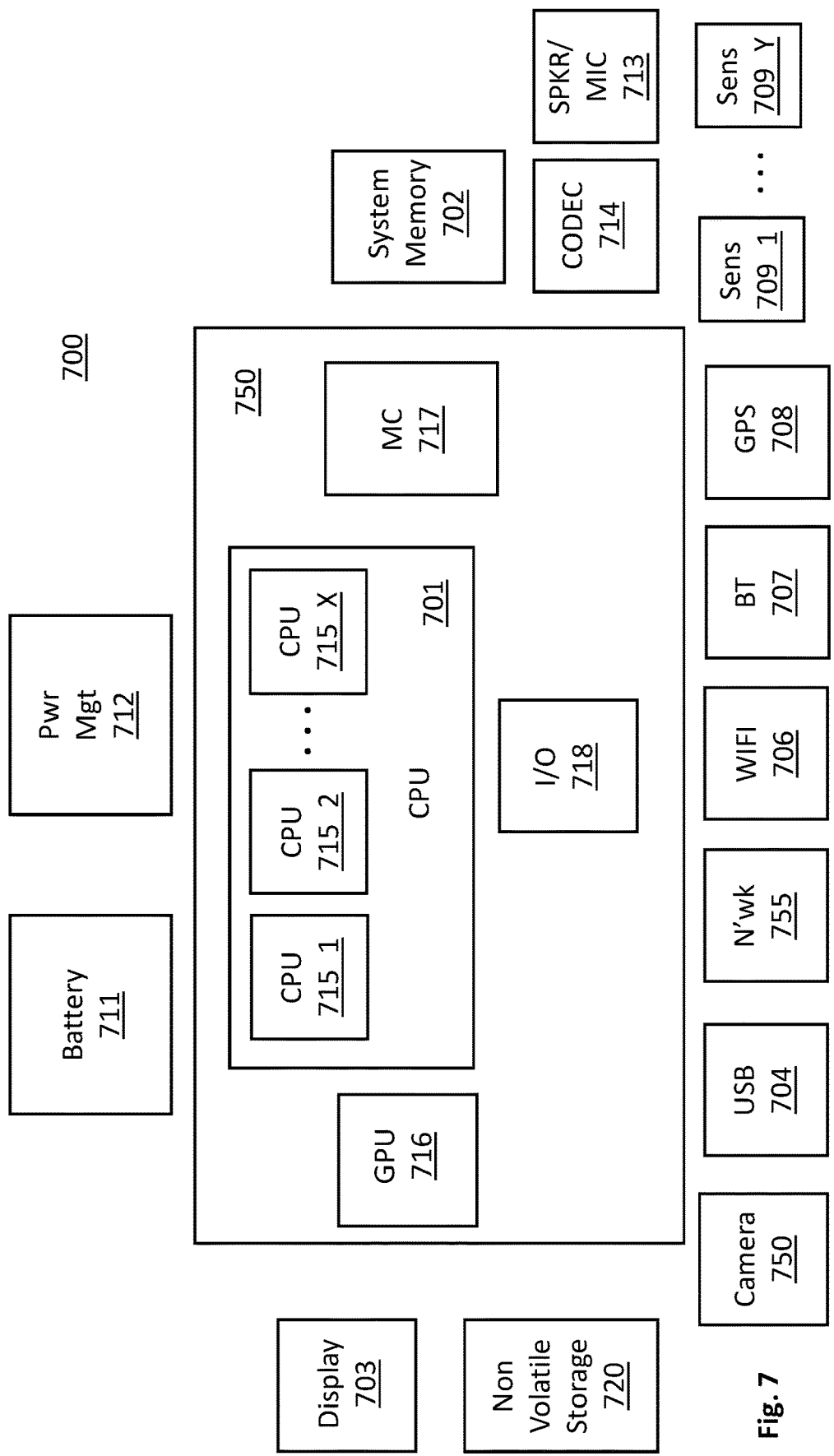
FIG. 7 shows a computing system.

FIG. 7 provides an exemplary depiction of a host computing system 700 (e.g., a smartphone, a tablet computer, a laptop computer, a desktop computer, a server computer, etc.). As observed in FIG. 7, the basic computing system 700 may include a central processing unit 701 (which may include, e.g., a plurality of general purpose processing cores 715_1 through 715_X) and a main memory controller 717 disposed on a multi-core processor or applications processor, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing unit 716 typically executes graphics intensive functions to, e.g., generate graphics information that is presented on the display 703. The memory control function 717 interfaces with the system memory 702 to write/read data to/from system memory 702. The memory control function 717 may include the ability to configure how many banks have their row activate commands collectively tracked by the memory control function 717 as a function of the number of ranks the memory control function 717 is configured to interface with as described above. The power management control unit 712 generally controls the power consumption of the system 700.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile storage 720 which may be the mass storage component of the system.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hardwired logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A memory controller, comprising:
a register to collectively track row activate commands sent to multiple memory chip banks of a memory rank; and,
a filter circuit to prevent an activate count value that is to be maintained in the register from being incremented in response to a row activate command that is sent to a different one of the multiple memory chip banks than a particular one of the multiple memory chip banks that a prior row activate command was sent to and that caused the activate count value to be incremented, wherein, the filter circuit comprises timer circuitry to measure a time period after the prior row activate command was sent, wherein, row activate commands sent before the time period elapses are understood to be directed to different ones of the multiple memory chip banks than the particular one of the multiple memory chip banks that the prior row activate command was sent to.

2. The memory controller of claim 1 wherein the memory controller comprises less instances of the register and filter than a maximum number of ranks multiplied by a number of memory banks per memory chip that the memory controller is able to interface with.

3. The memory controller of 1 wherein a number of memory chips of the multiple memory chip banks is configurable.

4. The memory controller of claim 3 wherein the memory controller comprises register space to establish the number of memory chips of the multiple memory chip banks.

5. The memory controller of claim 1 wherein the time period is a defined by a Row Cycle Time requirement of a Joint Electron Device Engineering Council (JEDEC) standard.

6. The memory controller of claim 5 wherein the JEDEC standard is a dual date rate 5 (DDR5) JEDEC standard.

7. The memory controller of claim 6 further comprising at least one register to store a rolling accumulated activation initial management threshold and a rolling accumulated activation maximum management threshold values and circuitry coupled to the registers and the register to raise a flag that a refresh command should be sent.

8. The memory controller of claim 5 wherein the filter circuit receives a clock having a temporal period that is a fraction of the Row Cycle Time.

9. A computing system, comprising:
a plurality of processing cores;
a main memory comprised of multiple ranks of memory chips;
a memory controller coupled between the plurality of processing cores and the main memory, the memory controller comprising:
a register to collectively track row activate commands sent to multiple memory chip banks of a memory rank; and,
a filter circuit to prevent an activate count value that is to be maintained in the register from being incremented in response to a row activate command that is sent to a different one of the multiple memory chip banks than a particular one of the multiple memory chip banks that a prior row activate command was sent to and that caused the activate count value to be incremented, wherein, the filter circuit comprises timer circuitry to measure a time period after the prior row activate command was sent, wherein, row activate commands sent before the time period elapses are understood to be directed to different ones of the multiple memory chip banks than the particular one of the multiple memory chip banks that the prior row activate command was sent to.

10. The computing system of claim 9 wherein the memory controller comprises less instances of the register and filter than a maximum number of ranks multiplied by a number of memory banks per memory chip that the memory controller is able to interface with.

11. The computing system of 9 wherein a number of the memory chips is configurable.

12. The computing system of claim 11 wherein the memory controller comprises register space to establish the number.

13. The computing system of claim 9 wherein the time period is a defined by a Row Cycle Time requirement of a Joint Electron Device Engineering Council (JEDEC) standard.

14. The computing system of claim 13 wherein the JEDEC standard is a dual date rate 5 (DDR5) JEDEC standard.

15. The computing system of claim 14 further comprising at least one register to store rolling accumulated activation initial management threshold and rolling accumulated activation maximum management threshold values and circuitry coupled to the at least one register and the register to raise a flag that a refresh command should be sent.

* * * * *